(12) United States Patent
Boland (10) Patent No.: US 7,353,941 B2
(45) Date of Patent: Apr. 8, 2008

(54) CASE FOR AT LEAST ONE RECORDABLE MEDIUM DISC

(76) Inventor: Brian Timothy Boland, 8 Cornock Ave., Thirroul, NSW, 2515 (AU)

( * ) Notice: Subject to any disclaimer, the term of this patent is extended or adjusted under 35 U.S.C. 154(b) by 0 days.

(21) Appl. No.: 10/416,194

(22) PCT Filed: Nov. 7, 2001

(86) PCT No.: PCT/AU01/01433

§ 371 (c)(1),
(2), (4) Date: May 7, 2003

(87) PCT Pub. No.: WO02/38469

PCT Pub. Date: May 16, 2002

(65) Prior Publication Data

US 2004/0028848 A1 Feb. 12, 2004

(30) Foreign Application Priority Data

Nov. 7, 2000 (AU) .................................... PR1255

(51) Int. Cl.
*G11B 33/04* (2006.01)
(52) U.S. Cl. .................................. 206/308.1; 428/34.1
(58) Field of Classification Search ............... 428/34.1, 428/99; 206/308.1
See application file for complete search history.

(56) References Cited

U.S. PATENT DOCUMENTS 5,715,938 A 2/1998 Cheris et al.
6,283,284 B1 9/2001 Crane et al.

FOREIGN PATENT DOCUMENTS

| EP | 0 272 042 A2 | 6/1986 |
| GB | 2 349 138 | 10/2000 |
| WO | WO 94/25376 | 11/1994 |

*Primary Examiner*—Alexander Thomas
(74) *Attorney, Agent, or Firm*—Knobbe, Martens, Olson & Bear, LLP (57) ABSTRACT

Recordable medium disc (72) case (20) including bottom (22); base portion (30) integral with bottom (20) and retention member (58); lid (24) for movement with respect to bottom between a parallel closed position adjacent bottom and open angled position; primary disc tray (36) releasably retaining a disc having a cam member (66), the primary disc tray moving between parallel storage position and angled access position. At least one of retention (58) or cam (66) members being flexible. Initial opening movement of lid (22) draws primary tray (36) to access position where continued movement causes retention member (58) to abut cam member (66) and retain primary tray in access position allowing further movement of lid in isolation. Closing of lid moves cam member (66) relative to retention (58) to a position releasing primary tray from access position so primary tray and lid move together to storage and closed position.

19 Claims, 6 Drawing Sheets

CASE FOR AT LEAST ONE RECORDABLE MEDIUM DISC

FIELD OF THE INVENTION

The present invention relates to a case for at least one recordable medium disc.

The invention has been primarily developed for use with 5-inch Compact Discs (CDs) which are stored within various standard size cases, known as a Jewel cases, and will be described with reference to this application. CD's are common in audio, computer and audio-visual applications. However, it will be appreciated that the invention is not limited to this particular application and is also suitable for use with discs of smaller (eg. Minidiscs) and larger (eg. Laserdiscs) sizes.

BACKGROUND OF THE INVENTION

Several different arrangements of CD cases and other disc cases are known that hold one or more CDs or discs. The most common form of CD case is the Jewel case which has a base portion that locks into the bottom of the case. The base portion has an annular recess complimentary to the CD and an inner cylindrical protuberance which is an interference or sprung fit with the central hole of the CD to retain the CD adjacent the base portion. Other known cases also include some means of retaining a disc adjacent the bottom or base of the case.

A disadvantage of these known types of disc cases is gripping access to the disc is limited as the disc sits flush with the base portion of the case bottom, which makes removal difficult.

OBJECT OF THE INVENTION

It is the object of the present invention to substantially overcome or at least ameliorate the above disadvantage.

SUMMARY OF THE INVENTION

Accordingly, the present invention provides a case for at least one recordable medium disc, the case including:

a bottom;

a base portion adapted to engage, or integrally formed with, the bottom and having a retention member;

a lid adapted mounted for movement with respect to the bottom between a closed position substantially parallel and adjacent to the bottom and an open position angled with respect to the bottom; and a primary disc tray adapted to releasably retain a disc adjacent thereto and having a cam member, the primary disc tray adapted for movement relative to the bottom between a storage position substantially parallel and adjacent to the bottom and an access position angled with respect to the bottom;

wherein at least one of the retention member or the cam member is resiliently flexible, whereby, when the lid is in the closed position, the lid and the primary disc tray are in an engaged abutting relationship and initial movement of the lid towards the open position draws the primary disc tray to the access position at which continued movement of the lid causes at least one of the cam member or the retention member to flex which allows movement of the cam member relative to the retention member into a position where the retention member abuts the cam member and retains the primary disc tray in the access position and where the primary disc tray disengages from the lid to allow further continued movement of the lid in isolation, and when the lid is in the open position and disengaged with the primary disc tray, initial movement of the lid towards the closed position abuttingly engages the lid with the primary disc tray and continued movement of the lid causes at least one of the cam member or the retention member to flex which allows movement of the cam member relative to the retention member to a position releasing the primary disc tray from the access position for movement together of the primary tray and the lid towards the storage and closed positions respectively.

The lid is preferably adapted for movement with respect to the bottom to an angle larger than the access angle of the primary tray. The lid is more preferably adapted for movement through an angle of about 180 degrees with respect to the bottom and the access angle of the primary tray is about 45 degrees. The cam member is desirably substantially rigid and the retention member is resiliently flexible.

The primary disc tray preferably includes a ledge adapted to abut and engage an adjacent edge of the lid during drawing of the primary tray from the stored position to the access position by the lid.

The case preferably further includes a beam over which the cam member rides during movement into, and out of, the access position to assist such movement.

The primary tray preferably includes a pair of spigots adapted for sliding movement within corresponding slotted recesses in the base portion during movement into, and out of, the access position.

In a preferred form, the primary disc tray includes a secondary disc tray pivotally mounted thereto, the secondary disc tray adapted for movement between a storage position substantially parallel and adjacent to the bottom and an access position angled with respect to the bottom by a lesser angle than the primary tray in the access position. The movement of the secondary disc tray from the stored position past the access angled position is preferably prevented by abutment of a portion of the secondary disc tray with the primary tray. The secondary disc tray is pivotally mounted to the primary disc tray by: spigots on one of the primary or secondary disc trays being received in corresponding recesses in the other of primary or secondary disc trays; a thin flexible web between the primary disc tray and the secondary disc tray; or a snap engagable extension on one of the primary or secondary disc trays being loosely received within a corresponding slot in the other of the primary or secondary disc trays.

In another preferred form, the primary disc tray also includes a tertiary disc tray pivotally mounted thereto, the tertiary disc tray adapted for movement between a storage position substantially parallel and adjacent to said bottom and an access position angled with respect to the bottom by a lesser angle than the secondary tray in the access position. The movement of the tertiary disc tray from the stored position past the access angled position is preferably prevented by abutment of a portion of the tertiary disc tray with the primary tray. The tertiary disc tray is preferably pivotally mounted to the primary disc tray by: spigots on one of the primary or tertiary disc trays being received in corresponding recesses in the other of primary or tertiary disc trays; a thin flexible web between the primary disc tray and the tertiary disc tray; or a snap engagable extension on one of the primary or tertiary disc trays being loosely received within a corresponding slot in the other of the primary or tertiary disc trays.

The disc tray(s) desirably include a pair of biased together resiliently flexible protrusions adapted to respectively engage adjacent inner and outer edges of a disc(s) to releasably retain the disc(s) adjacent thereto.

The base portion desirably includes a pair of spigots adapted to engage corresponding recesses in said bottom.

The retention member preferably comprises a curved channel and a planar member.

The cam member preferably includes a substantially wedge shaped portion having an outer radius corresponding to an inner radius of the curved channel.

In one form, the base portion is separate to the bottom and adapted to engage the bottom, most preferably via outwardly facing spigots in the base portion being received within corresponding recesses in the bottom. In this form, the bottom and the lid are preferably of standard Jewel case size and more preferably also of standard Jewel case construction.

In another form, the base portion is integrally moulded with the bottom as a single component. In this form, the case is preferably of slimmer thickness than standard Jewel case construction.

BRIEF DESCRIPTION OF THE DRAWINGS

Preferred embodiments of the invention will now be described, by way of examples only, with reference to the accompanying drawings in which.

DETAILED DESCRIPTION OF THE PREFERRED EMBDIMENT

FIGS. 1 to 9 show a first embodiment of a disc case according to the present invention, which is suitable for use in storing up to three CDs. The case 20 include a bottom 22 and a lid 24 which are of standard Jewel case size and construction, and as are well known. The bottom 22 includes a rear side wall 25 with a pair (only one shown) of outwardly extending spigots 26 which are received within corresponding recesses 28 in the lid 24 to pivotally mount the lid 24 to the bottom 22. The lid 24 is able to pivot and move between a closed position, substantially parallel and adjacent to the bottom, (see FIG. 4) and an open position, angled with respect to the bottom 22 (see FIG. 1). The maximum angle by which the lid 24 can be opened with respect to the base 22 is approximately 180° (see FIG. 7). The case also includes a base portion 30 which engages the bottom 22 by virtue of a pair of outwardly facing spigots 32 (see FIG. 2) being received within corresponding recesses 34 in the rear side walls 25 of the bottom 22.

The case 20 also include a primary disc tray 36 which has a pair of biased together resiliently flexible protrusions 38 and 40 which are adapted to respectively engage adjacent inner and outer edges of a disc to releasably retain disc/a CD adjacent the primary disc tray 36. The protrusions 38 and 40 are undercut and beveled respectively (see FIG. 8) to assist in snap-engaging the CD.

The primary disc tray 36 also includes a pair (only one shown) of outwardly facing spigots 42 which are received within a pair (only one shown) of corresponding recessed slots 44 provided in the base portion 30. The spigots 42 and the slots 44 are best seen in FIG. 2. The spigots 42 and the slots 44 allow the primary disc tray 36 to move relative to the bottom 32 between a storage position, substantially parallel and adjacent to the bottom 22, (see FIG. 5) and an access position, angled with respect to the bottom 22, (see FIG. 1). The movement of the primary disc tray 36 between these positions will be described in more detail below.

Figure 1:
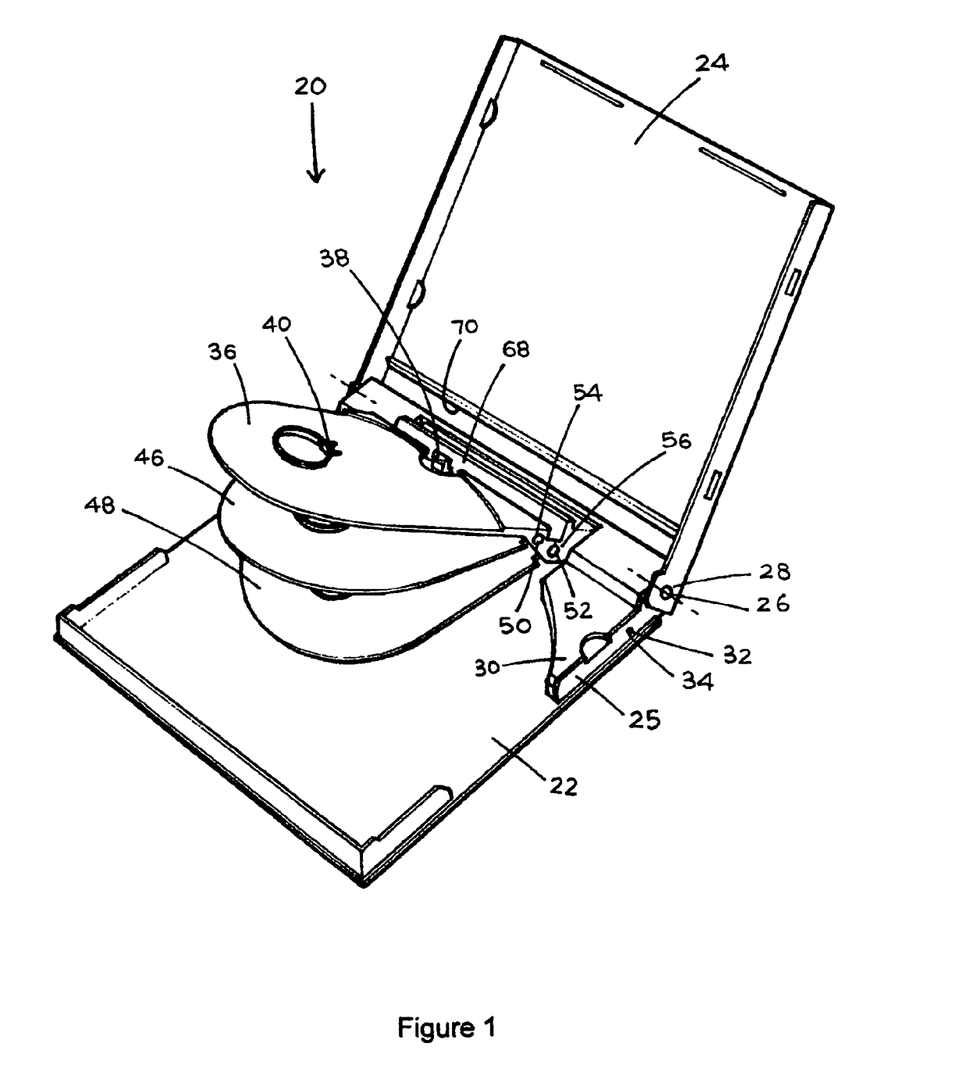
FIG. 1 is a perspective view of a case according to a first embodiment of the invention, with the lid open.
Figure 2:
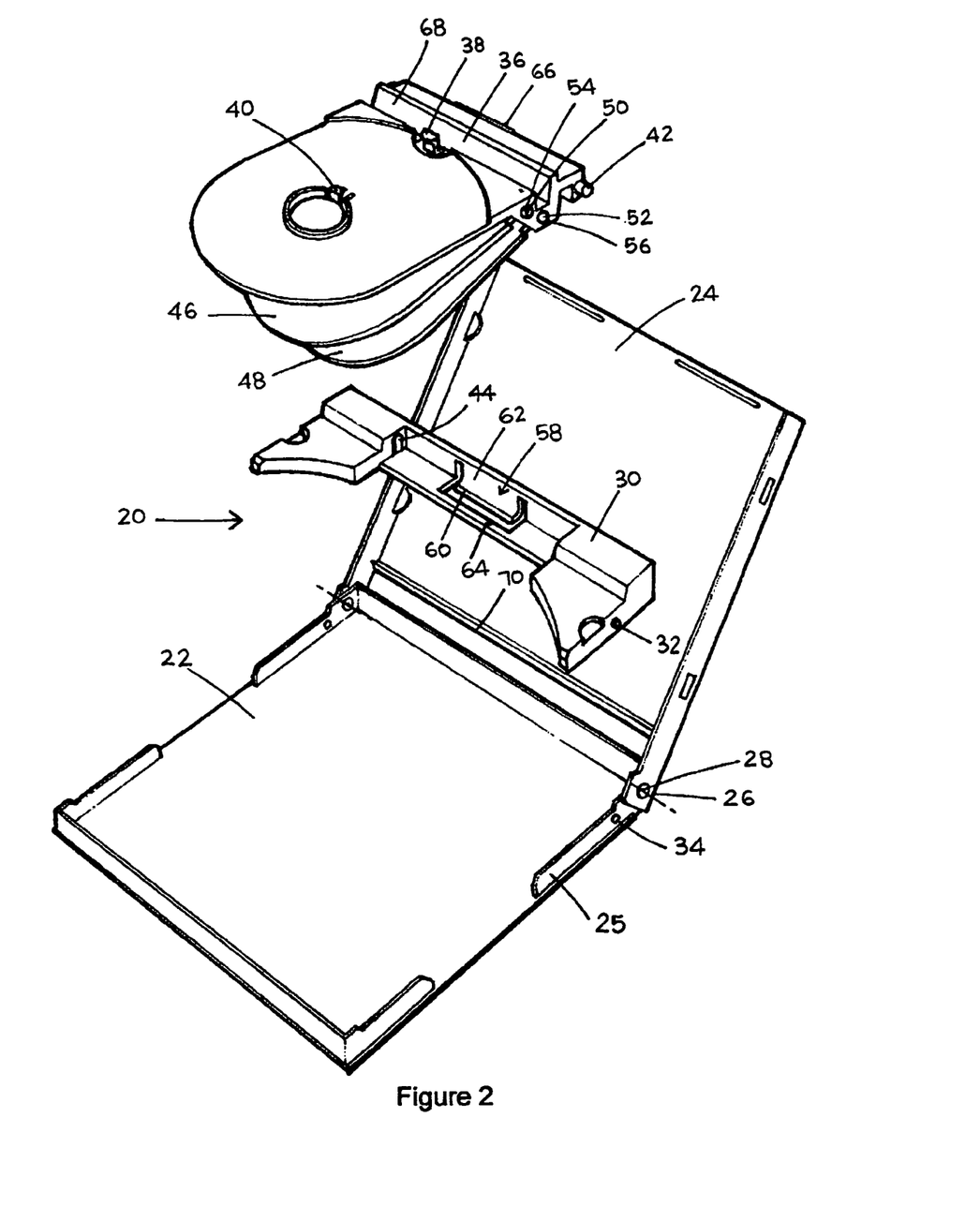
FIG. 2 is an exploded perspective view of the case shown in FIG. 1.
Figure 3:
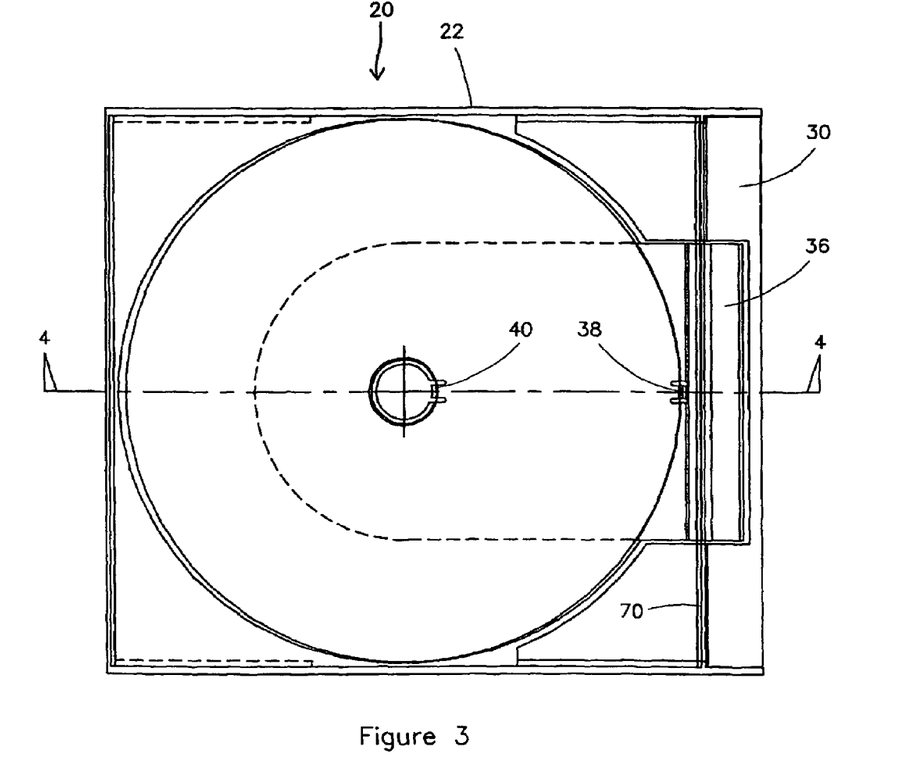
FIG. 3 is a top view of the case shown in FIGS. 1 and 2, with the lid closed.
Figure 4:
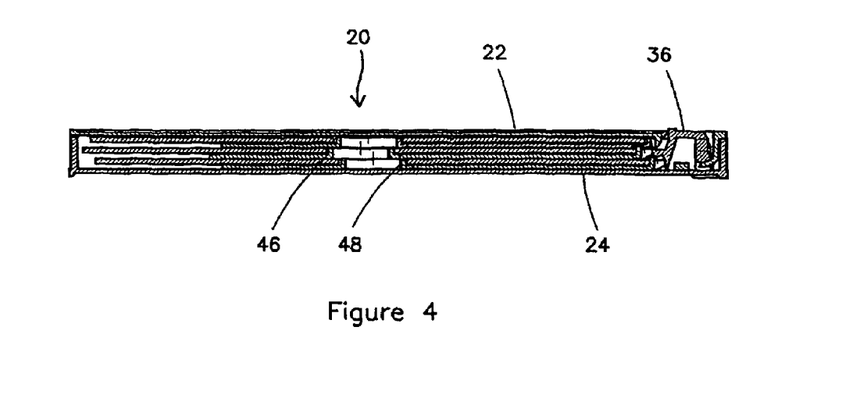
FIG. 4 is a cross-sectional side view of the CD case shown in FIGS. 1 to 3, along line 4-4 of FIG. 3.

As best shown in FIG. 1, the case 20 also includes a secondary disc tray 46 and a tertiary disc tray 48 which are each pivotally mounted to the primary disc tray by outwardly facing spigot pairs 50 and 52 (only one shown) on the trays 46 and 48 respectively being received within corresponding recess pairs 54 and 56 (only one shown) in the primary disc tray. Both the secondary and tertiary disc trays 46 and 48 also include protuberances to retain a CD adjacent thereto, substantially identical to the protuberances 38 and 40 on the primary disc tray.

Figure 5:
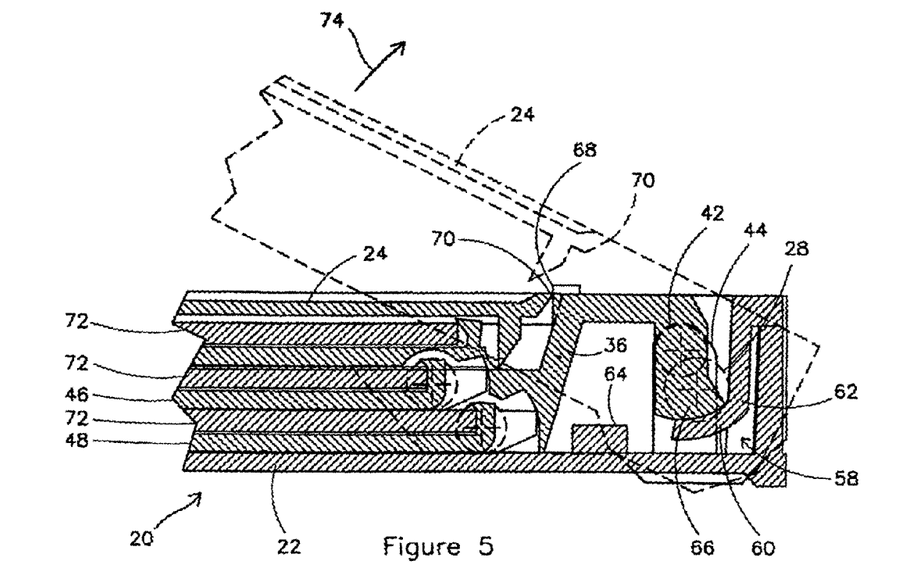
FIG. 5 is a partial enlarged cross-sectional side view of the case shown in FIGS. 1 to 4, with the lid closed.
Figure 6:
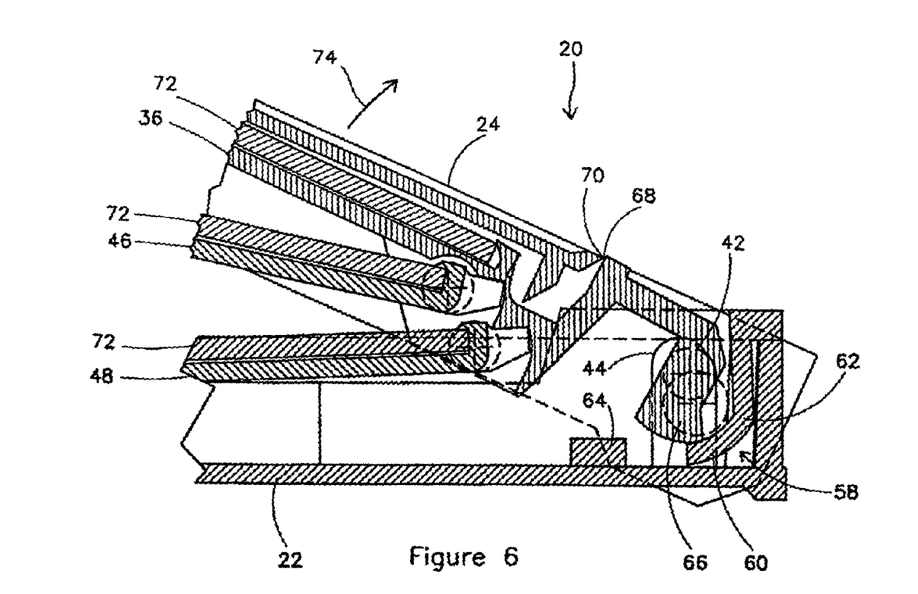
FIG. 6 is a partial enlarged cross-sectional side view of the case shown in FIGS. 1 to 5, during lid opening.
Figure 7:
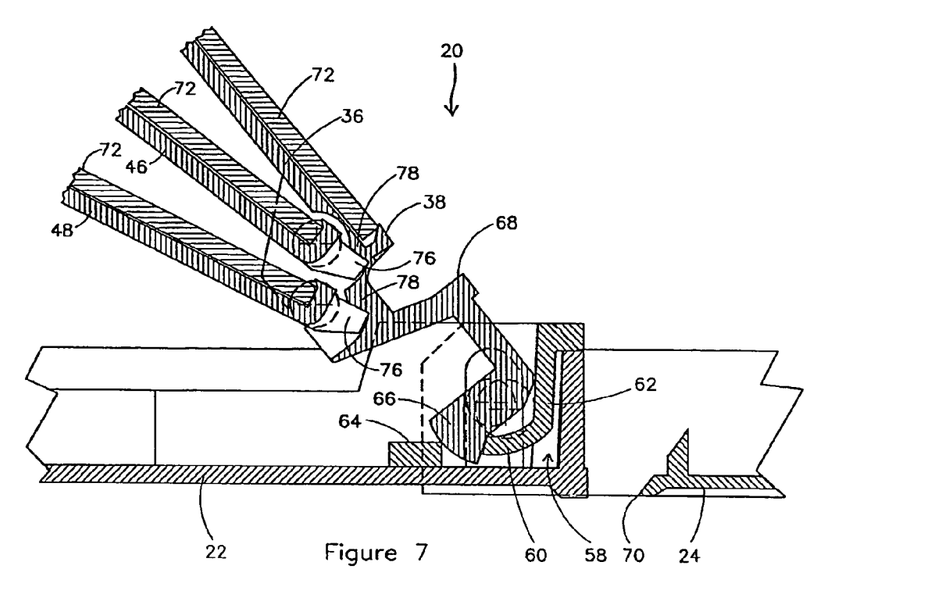
FIG. 7 is a partial enlarged cross-sectional side view of the case shown in FIGS. 1 to 6 with the lid open.
Figure 8:
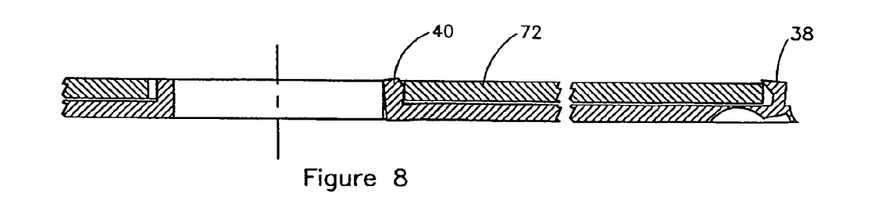
FIG. 8 is a partial enlarged cross-sectional side view of a primary disc tray used in the case shown in FIGS. 1 to 7.
Figure 9:
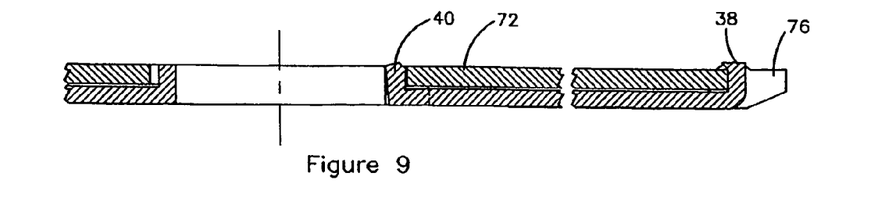
FIG. 9 is a partial enlarged cross-sectional side view of a secondary or tertiary disc tray used with the case shown in FIGS. 1 to 7.

As best shown in FIGS. 5 to 7, the base portion 30 includes a resiliently flexible retention member, indicated generally by the reference numeral 58, which comprises a curved channel 60 connected to planar member 62. The channel 60 and member 62 are integrally formed with the base portion 30. The base portion 30 also includes a beam 64.

Also as best shown in FIGS. 5 to 7, the primary disc tray 36 includes a substantially wedged shape cam member 66 which has an outer radius that substantially corresponds to the inner radius of the channel 60. The primary disc tray 36 also includes a ledge 68 which is adapted to abut, and engage, an edge 70 of the lid 24, as will be described in more detail below.

In the preferred form shown, the bottom 22, lid 24, base portion 30, primary CD tray 36, the secondary disc tray 46 and the tertiary disc tray 48 are moulded from a plastics material, such as high impact polystyrene (HIPS) or acrylonitrile butadiene styrene (ABS).

The operation of the disc case 20 will now be described. FIG. 5 shows the case 20 with the lid 24 in the closed position and each of the disc trays 36, 46, 48 in the storage position, and each having a CD 72 engaged therewith. It should be noted that in these positions, the edge 70 of the lid 24 abuts the ledge 68 of the primary disc tray 36 and the spigots 42 of the primary disc tray 36 are at the end of the slots 44 nearest the lid 24. When the lid 24 is opened in the normal manner by movement away from the bottom 22, as indicated by the arrow 74, the edge of the lid 70 abuts and engages with the ledge 68 of the primary tray member to draw the primary disc tray 36 with the lid 24 away from the bottom, as shown in FIG. 6. During this movement, the cam member 66 travels along the curved channel 60, which resiliently flexes towards the bottom 22. The spigots 42 of the primary disc tray also move within the slots 44 towards the bottom 22. Further continued movement of the lid 22 causes the cam member 66 to travel past the end of the curved channel 60 and move to the position shown in FIG. 7. In this position, the free end of the curved channel 60 abuts and engages with the side of the cam member 66 which retains the primary disc tray 36 in the position shown in FIG. 7 (ie. the access position) by preventing it from falling back towards the bottom 22. As the cam member 66 travels off the end of the curved channel 60 it also permits the spigots 42 of the primary CD tray 36 to move through the slots 44 further towards the bottom 22 until the abutting engagement of the lid edge 70 and the primary CD tray 36 with the ledge 68 is released. This allows the lid 24 to continue moving away from the bottom 22 in isolation, as shown in FIG. 7.

In the access position shown in FIG. 7, the secondary and tertiary disc trays 46 and 48 also move, under the influence of gravity, to positions angled with respect of the bottom 22. The movement of the secondary and tertiary disc trays 46 and 48 is restricted by projections 76 on the trays abutting with corresponding recesses 78 provided in the primary disc tray 36.

The access position of the primary disc tray 36 presents it at an elevated position with respect to the bottom 22 of the case 20 and provides improved access to the disc trays 36, 46 and 48 and any associated CDs for their placement on, and removal from, their respective disc trays. The access position also allows grasping access to a much larger proportion of the CDs than known arrangements.

To close the case 20, the lid 24 is moved towards the bottom 22 until it abuts the primary disc tray 36 or any CD thereon. Further movement of the lid 24 towards the bottom 32 causes corresponding movement of the primary disc tray 36. This movement of the primary disc tray 36 causes the cam member 66 to move away from the bottom 22 and back onto the curved channel 60, as shown in FIG. 6. The curved channel 60 flexes towards the bottom 22 during this movement. The movement of the cam member 60 back onto the channel 60 is assisted by the curved face of the cam member 66 riding over the adjacent surface of the beam 64. This movement also causes the spigots 42 of the primary disc tray 36 to travel towards the lid end of the slots 44 until the primary CD tray ledge 68 is returned into abutment with the lid edge 70, as also shown in FIG. 6. Further continued movement of the lid 22 towards the bottom causes the outer surface of the cam member 66 to travel along the inner surface of the curved channel 60 as the lid 70 and primary disc tray 30 travel together to the closed and storage positions respectively.

Figure 10:
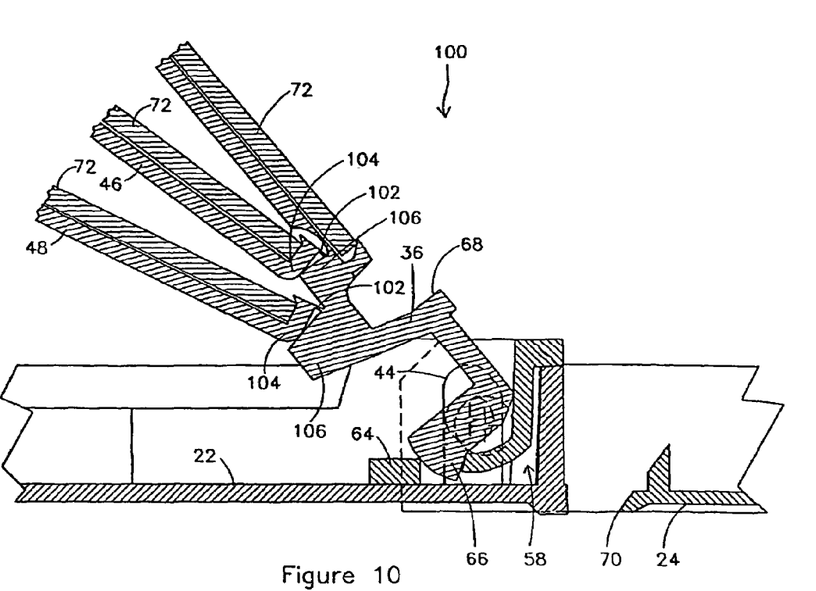
FIG. 10 is an enlarged partial cross-sectional side view of a case according to a second embodiment of the invention.

FIG. 10 shows a second embodiment of a case 100 in accordance with the invention. The case 100 is very similar to the case 20 previously described and like reference numerals are used to indicate like features. However, in the case 100, the secondary and tertiary disc trays 46 and 48 are integrally formed with the primary disc tray 36 and connected thereto by thin flexible webs 102. The movement of the secondary and tertiary disc trays 46 and 48 relative to the primary tray 36 is restricted by the abutment between the portions 104 of the secondary and tertiary disc trays 46 and 48 with portions 106 of the primary disc tray 36.

Figure 11:
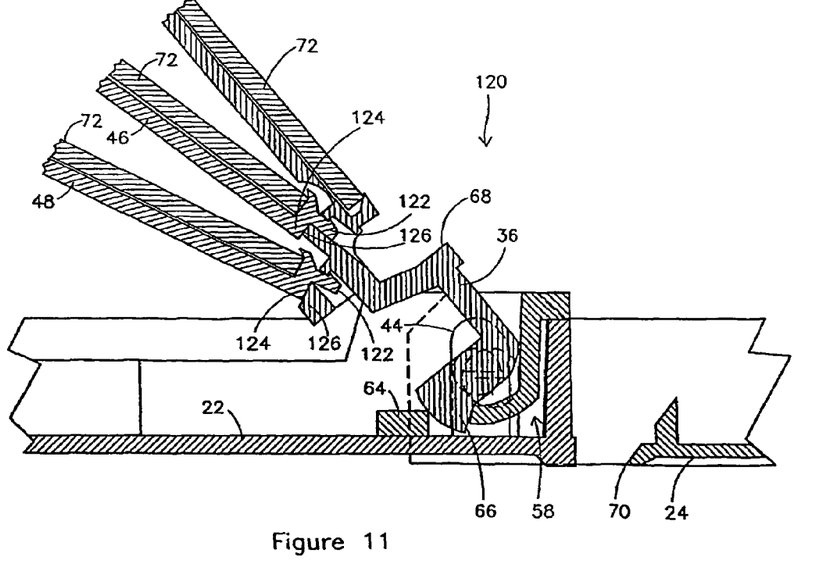
FIG. 11 is a partial enlarged cross-sectional side view of a CD case in accordance with a third embodiment of the invention.

FIG. 11 shows a third embodiment of a case 120 in accordance with the invention, which again is very similar to the case 20 and like reference numerals have been used to indicate like features. However, in the case 120, the primary and tertiary disc trays 46 and 48 include snap engagable barbed extensions 122 which are loosely received with corresponding slots 124 provided, in the primary disc tray 36. In this embodiment, the movement of the secondary and tertiary disc trays 46 and 48 is restricted by the portions 126 of the secondary and tertiary disc trays 46 and 48 abutting against the portions 128 of the primary disc trays 36.

As noted above, the main advantage of the invention is that it presents at least one disc (CD) in an access position elevated away from the bottom of the case, thereby providing superior grasping access to same. Another advantage of the preferred embodiments of the invention is it provides storage for to up to three CDs within a standard sized CD Jewel case. A further advantage of the preferred embodiments is the base portion and primary disc tray are adapted for fitment to, and co-operate with, the bottom and lid of a standard CD Jewel case, which are in mass production in many parts of the world.

Although the invention has been described with reference to specific embodiments, it will be appreciated by those skilled in the art that the invention may be embodied in many other forms. For example, although the preferred embodiments can store a maximum of three CDs, the invention is also suitable for use in a case configured to store only one or two discs in the above described storage position. Further, the invention is also suitable for use in a case configured to store more than three discs. Also, although described in relation to a standard Jewel CD case, the invention can also be adapted for fitment to other types of disc case and enlarged or reduced in size to suit larger or smaller disc formats. In another embodiment (not shown), the base portion is integrally moulded with the bottom as a single component, which allows construction of a case that is of slimmer thickness than standard Jewel case construction. The case thickness can also be adjusted to suit the number of discs that are intended to be stored in the case.

The invention claimed is:

1. A case for at least one recordable medium disc, the case including:
   a bottom;
   a base portion integrally formed with, or adapted to engage, the bottom and having a retention member;
   a lid adapted mounted for movement with respect to the bottom between a closed position substantially parallel and adjacent to the bottom and an open position angled with respect to the bottom; and
   a primary disc tray adapted to releasably retain a disc adjacent thereto and having a cam member, the primary disc tray adapted for movement relative to the bottom between a storage position substantially parallel and adjacent to the bottom and an access position angled with respect to the bottom;
   wherein at least one of the retention member or the cam member is resiliently flexible,
   whereby, when the lid is in the closed position, the lid and the primary disc tray are in an engaged abutting relationship and initial movement of the lid towards the open position draws the primary disc tray to the access position at which continued movement of the lid causes at least one of the cam member or the retention member to flex which allows movement of the cam member relative to the retention member into a position where the retention member abuts the cam member and retains the primary disc tray in the access position and where the primary disc tray disengages from the lid to allow further continued movement of the lid in isolation, and when the lid is in the open position and disengaged with the primary disc tray, initial movement of the lid towards the closed position abuttingly engages the lid with the primary disc tray and continued movement of the lid causes at least one of the cam member or the retention member to flex which allows movement of the cam member relative to the retention member to a position releasing the primary disc tray from the access position for movement together of the primary tray and the lid towards the storage and closed positions respectively.

2. The case as claimed in claim 1, wherein the lid is adapted for movement with respect to the bottom to an angle larger than the access angle of the primary tray.

3. The case as claimed in claim 2, wherein the lid is adapted for movement through an angle of about 180 degrees with respect to the bottom and the access angle of the primary tray is about 45 degrees.

4. The case claimed in claim 1, wherein the cam member is substantially rigid and the retention member is resiliently flexible.

5. The case as claimed in claim 1, wherein the primary disc tray includes a ledge adapted to abut and engage an adjacent edge of the lid during drawing of the primary tray from the stored position to the access position by the lid.

6. The case as claimed in claim 1, further including a beam over which the cam member rides during movement into, and out of, the access position to assist such movement.

7. The case as claimed in claim 1, wherein the primary tray includes a pair of spigots adapted for sliding movement within corresponding slotted recesses in the base portion during movement into, and out of, the access position.

8. The case claimed in claim 1, wherein the primary disc tray includes a secondary disc tray pivotally mounted thereto, the secondary disc tray adapted for movement between a storage position substantially parallel and adjacent to the bottom and an access position angled with respect to the bottom by a lesser angle than the primary tray in the access position.

9. The case as claimed in claim 8, wherein the movement of the secondary tray from the storage position past the access angled position is prevented by abutment of a portion of the secondary tray with the primary disc tray.

10. The case as claimed in claim 8, wherein the secondary disc tray is pivotally mounted to the primary disc tray by: spigots on one of the primary or secondary disc trays being received in corresponding recesses in the other of primary or secondary disc trays; a thin flexible web between the primary disc tray and the secondary disc tray; or a snap engagable extension on one of the primary or secondary disc trays being loosely received within a corresponding slot in the other of the primary or secondary disc trays.

11. The case claimed in claim 8, wherein the primary disc tray includes a tertiary tray pivotally mounted thereto, the tertiary disc tray adapted for movement between a storage position substantially parallel and adjacent to said bottom and an access position angled with respect to the bottom by a lesser angle than the secondary disc tray in the access position.

12. The case as claimed in claim 11, wherein the movement of the tertiary disc tray from the storage position past the access angles position is prevented by abutment of a portion of the tertiary disc tray with the primary tray.

13. The case as claimed in claim 11, wherein the tertiary disc tray is pivotally mounted to the primary disc tray by: spigots on one of the primary or tertiary disc trays being received in corresponding recesses in the other of primary or tertiary disc trays; a thin flexible web between the primary disc tray and the tertiary disc tray; or a snap engagable extension on one of the primary or tertiary disc trays being loosely received within a corresponding slot in the other of the primary or tertiary disc trays.

14. The case as claimed in claim 8, wherein the disc tray(s) include a pair of biased together resiliently flexible protrusions adapted to respectively engage adjacent inner and outer edges of a disc(s) to releasably retain the disc(s) adjacent thereto.

15. The case as claimed in claim 1, wherein the retention member includes a curved channel and a planar member.

16. The case as claimed in claim 15, wherein the cam member includes a substantially wedge shaped portion having an outer radius corresponding to an inner radius of the curved channel.

17. The case as claimed in claim 1, wherein the base portion is separate to the bottom.

18. The case as claimed in claim 17, wherein the base portion is adapted to engage the bottom via outwardly facing spigots being received within corresponding recesses in the bottom.

19. The case as claimed in claim 1, wherein the base portion is integrally moulded with the bottom as a single component.

* * * * *